S. WIEHL.
PREVENTIVE INTERCOURSE APRON.
APPLICATION FILED OCT. 3, 1912.

1,075,237.

Patented Oct. 7, 1913.

WITNESSES

INVENTOR.
S. WIEHL.

BY

ATT'Y.

UNITED STATES PATENT OFFICE.

SAMUEL WIEHL, OF SISTERS, OREGON.

PREVENTIVE INTERCOURSE-APRON.

1,075,237.

Specification of Letters Patent. Patented Oct. 7, 1913.

Application filed October 3, 1912. Serial No. 723,724.

*To all whom it may concern:*

Be it known that I, SAMUEL WIEHL, a citizen of the United States, and resident of Sisters, in the State of Oregon, one of the United States of America, have invented certain new and useful Improvements in Preventive Intercourse-Aprons, of which the following is a specification.

My invention relates to improvements in preventive intercourse aprons for rams and the objects of the invention are to provide a simple and effective means by which intercourse may be prevented when not desired and which will also protect the organs of the animal and it consists essentially of an apron which is sewn to the wool of the animal in the manner hereinafter set forth and described in the accompanying specification and drawings.

Figure 1:
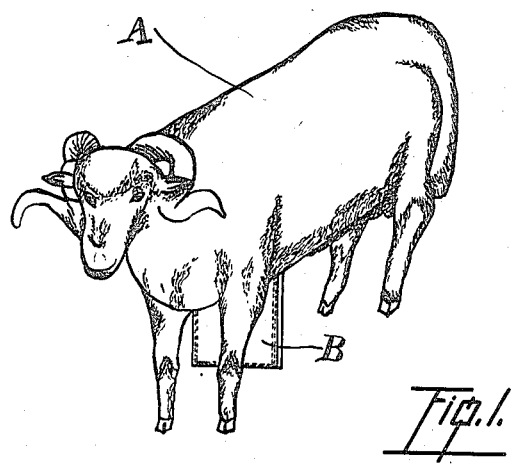
Figure 3:
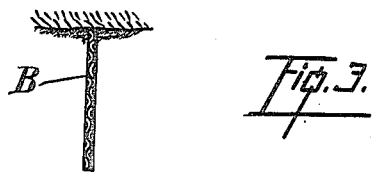
Figure 2:
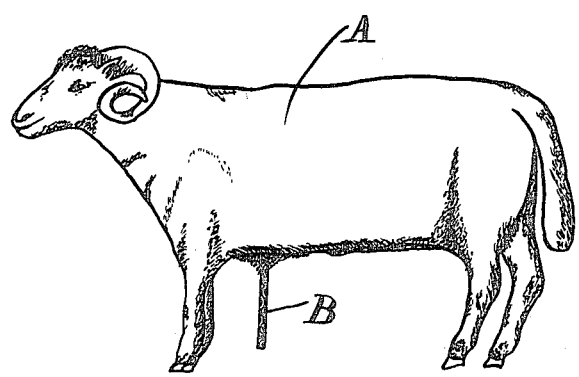

In the drawings, Figure 1 is a perspective view of the apron in position on the animal. Fig. 2 is a side view of the same. Fig. 3 is a sectional detail of the apron.

In the drawings like characters of reference indicate corresponding parts in all the figures.

Referring to the drawings, A represents a ram or like animal and B represents my improved apron conveniently formed of a piece of canvas six or seven inches square. The wool on the chest of the animal is parted and one edge of the canvas apron is placed next to the hide and then the apron is sewn to the wool with large stitches, considerable amount of wool being gathered with each stitch.

The advantages of the apron are: 1. Prevention of intercourse when such act is not desired. 2. Permitting rams to run with ewes at any time (without danger of intercourse), and furnishing protection from dogs or other animals. 3. Ease and quickness of application, as well as cleanliness over other forms of aprons in use, this device hanging clear of the body and shield and not restraining the normal action of the body, the other forms being tied on around the body and over the shield, tightening up when ram is filled with food and water and becoming loose when animal is empty.

As many changes could be made in the above construction and many apparently widely different embodiments of my invention, within the scope of the claim, constructed without departing from the spirit or scope thereof, it is intended that all matter contained in the accompanying specification and drawings shall be interpreted as illustrative and not in a limiting sense.

What I claim as my invention is:

An apron for the purpose specified of flexible material having one edge inserted between the wool of the animal and sewn thereto, and to hang downwardly, substantially as and for the purpose specified.

In witness whereof I have hereunto set my hand in the presence of two witnesses.

SAMUEL WIEHL.

Witnesses:
P. J. LIETHAUSER,
E. H. HOWELL.